(No Model.)

J. B. JOHNSON.
SPLIT SLIP COLLAR.

No. 555,512. Patented Mar. 3, 1896.

WITNESSES:
Chas. W. Marvin
Matie Lavergne

INVENTOR
John B. Johnson
BY
Smith & Denison
ATTORNEYS.

ANDREW B.GRAHAM. PHOTO-LITHO. WASHINGTON, D.C.

UNITED STATES PATENT OFFICE.

JOHN B. JOHNSON, OF GOUVERNEUR, NEW YORK.

SPLIT SLIP-COLLAR.

SPECIFICATION forming part of Letters Patent No. 555,512, dated March 3, 1896.

Application filed October 12, 1893. Serial No. 487,985. (No model.)

*To all whom it may concern:*

Be it known that I, JOHN B. JOHNSON, of Gouverneur, in the county of St. Lawrence, in the State of New York, have invented new and useful Improvements in Split Slip-Collars, of which the following, taken in connection with the accompanying drawings, is a full, clear, and exact description.

This invention relates to slip-collars for pulley-shafts as a new article of manufacture.

My object is to produce and construct a safety split slip-collar for shafting for the purpose of sustaining a pulley or wheel longitudinally upon a shaft and retaining it in its proper place, and which may be detachably placed upon the shaft without occupying more space than its width; and my further object is to construct such a collar in which the heads of the fastening-screws are sunk beneath the outer periphery of the collar, thereby removing them from liability of contact with the belts, and in the several other new and novel features hereinafter described and which are specifically set forth in the claim hereunto annexed. It is constructed as follows, reference being had to the accompanying drawings, in which—

Figure 1:
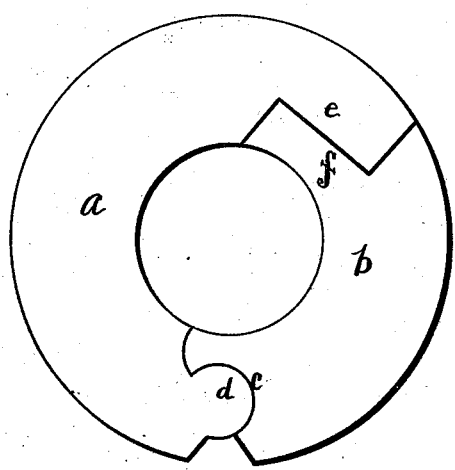
Figure 4:
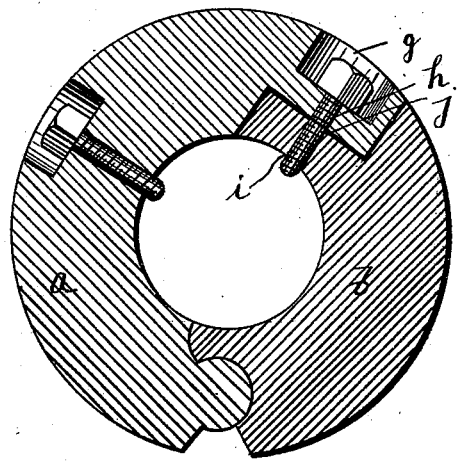
Figure 2:
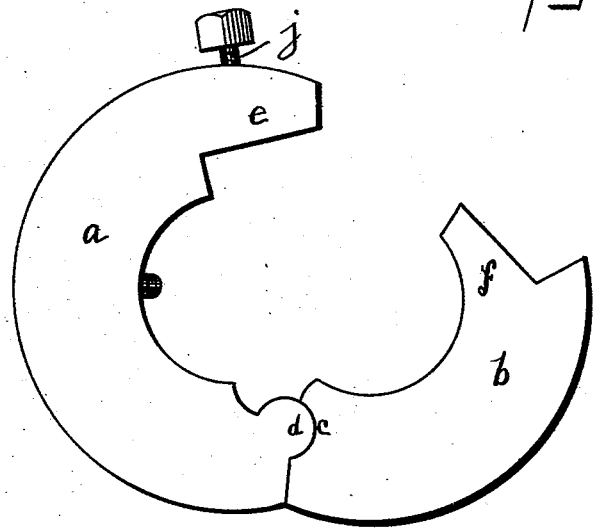
Figure 3:
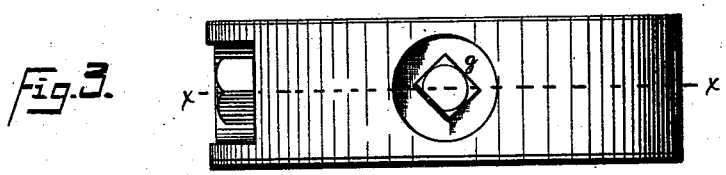

Figure 1 is a side view of the collar complete, closed, detached. Fig. 2 is a similar view showing collar open. Fig. 3 is a top edge view thereof. Fig. 4 is a vertical section on line $x\,x$, Fig. 2.

The split collar is composed of two parts $a$ $b$ and is provided with a rounded dovetailed rocking groove $c$ and tenon $d$ upon one side, on the adjacent ends of the two parts, and adapted to be secured together when in the position shown in Figs. 1 and 4 and detached when in the position shown in Fig. 3. The opposite ends of the collar are constructed substantially as shown, the part $a$ having the overhanging lip $e$ resting upon the jaw $f$. The lip $e$ has a cup or depression $g$ coincident with the screw-threaded opening $h$, which in turn is also coincident with the screw-threaded opening $i$ in the jaw, in which openings the clamping-screw $j$ is adapted to engage for the purpose of clamping the parts together, the head of said screw or bolt lying within the depression $g$ when the collars are in use, as shown in Fig. 4. Upon an adjacent portion or section of the collar is a similar depression having a threaded opening leading therefrom to the inner face of the collar, and a screw or threaded bolt adapted to engage with said opening and having its inner end abut against the shaft, the head of said screw or bolt adapted to lie within the depression $g$ so that its upper face will be either flush or slightly below the outer periphery of the collar.

It will thus be observed that by removing the screws the collar may be removed by forcing the upper portion apart at right angles to the shaft, thereby requiring no more space in placing or removing the collar than the space consumed by the width of the collar. It will also be observed that the number of screws or bolts used in its construction is reduced to a minimum. Their heads are let below the periphery, thereby reducing to the minimum the liability of their getting in contact with bolts or with other devices by which they may be broken.

What I claim as new, and desire to secure by Letters Patent, is—

A split slip-collar comprising two parts secured together by a rocking groove-and-tenon joint, their opposite ends provided with a lip and jaw respectively, and shoulders against which the ends abut, the lip having a depression and there being a coincident screw-threaded opening in the lip and jaw, a bolt engaging the same, there being also a depression in the collar and a screw-threaded opening, and a set-screw to pass through said opening and engage the shaft, as and for the purpose specified.

In witness whereof I have hereunto set my hand this 25th day of September, 1893.

JOHN B. JOHNSON.

In presence of—
E. B. WARE,
P. J. H. WHITTAKER.